United States Patent
Shalit

(12) 
(10) Patent No.: US 11,731,713 B2
(45) Date of Patent: *Aug. 22, 2023

(54) ANTI-JACKKNIFING APPARATUS

(71) Applicant: Michael Shalit, Boerne, TX (US)

(72) Inventor: Michael Shalit, Boerne, TX (US)

( * ) Notice: Subject to any disclaimer, the term of this patent is extended or adjusted under 35 U.S.C. 154(b) by 62 days.

This patent is subject to a terminal disclaimer.

(21) Appl. No.: 17/407,332

(22) Filed: Aug. 20, 2021

(65) Prior Publication Data

US 2021/0380181 A1 Dec. 9, 2021

Related U.S. Application Data

(63) Continuation of application No. 16/678,632, filed on Nov. 8, 2019, now Pat. No. 11,142,265.

(51) Int. Cl.
*B62D 53/02* (2006.01)
*G01S 17/58* (2006.01)
*B62D 53/08* (2006.01)
*G07C 5/08* (2006.01)

(52) U.S. Cl.
CPC .......... *B62D 53/0871* (2013.01); *G01S 17/58* (2013.01); *G07C 5/08* (2013.01)

(58) Field of Classification Search
CPC .... B62D 53/08; B62D 53/0871; B62D 12/02; G07C 5/08; G01S 17/58
See application file for complete search history.

(56) References Cited

U.S. PATENT DOCUMENTS

| | | | |
|---|---|---|---|
| 3,063,739 | A | 11/1962 | Davies |
| 3,837,678 | A | 9/1974 | Cicero |
| 3,972,542 | A | 8/1976 | Dirks et al. |
| 4,068,860 | A | 1/1978 | Meyers et al. |
| 4,585,248 | A | 4/1986 | Miller |
| 4,700,966 | A | 10/1987 | Hawkins et al. |
| 4,784,403 | A | 11/1988 | Hawkins et al. |
| 4,790,556 | A | 12/1988 | Hawkins et al. |
| 4,934,727 | A | 6/1990 | Hawkins et al. |
| 4,986,560 | A | 1/1991 | Tambay |
| 5,232,239 | A | 8/1993 | Hawkins et al. |
| 5,912,616 | A | 6/1999 | Valentino |
| 5,957,476 | A | 9/1999 | Simpson |
| 6,746,035 | B1 | 6/2004 | Williams et al. |
| 6,854,557 | B1 | 2/2005 | Deng et al. |
| 7,175,194 | B2 | 2/2007 | Ball |
| 7,540,523 | B2 | 6/2009 | Russell |

(Continued)

*Primary Examiner* — Tan Q Nguyen
(74) *Attorney, Agent, or Firm* — Weitzman Law Offices, LLC

(57) ABSTRACT

Multiple exemplary systems for preventing jackknifing are disclosed. The systems comprise an electric motor for extending a shaft into a fifth wheel coupling when a tractor trailer is traveling at above a predetermined speed in a forward direction, physically preventing the tractor trailer from jackknifing. In order to avoid dependence on integration with a tractor, sensors on a trailer are used to determine speed without communication with the tractor or any instruments therein, via reception of one or more waves. When the trailer is determined to be traveling at below the predetermined speed in a forward direction, or at any speed in a backward direction, the shaft is retracted to allow the trailer to freely rotate with respect, to the tractor.

20 Claims, 6 Drawing Sheets

(56) References Cited

U.S. PATENT DOCUMENTS

| | | | |
|---|---|---|---|
| 7,703,790 B2 * | 4/2010 | Cunefare | B62D 53/0878 |
| | | | 280/433 |
| 8,960,703 B1 | 2/2015 | Hansen | |
| 2005/0131603 A1 * | 6/2005 | Liu | B60R 1/025 |
| | | | 701/36 |
| 2013/0253814 A1 * | 9/2013 | Wirthlin | G01G 19/02 |
| | | | 701/1 |
| 2020/0081117 A1 * | 3/2020 | Flores Tapia | G01S 7/415 |

* cited by examiner

ANTI-JACKKNIFING APPARATUS

CROSS-REFERENCE TO RELATED APPLICATION

This application is a continuation of co-pending U.S. patent application Ser. No. 16/678,632, filed Nov. 8, 2019 and also titled "Anti-Jackknifing Apparatus", which is hereby incorporated by reference in its entirety.

FIELD OF INVENTION

This application relates to physical devices for installation on trailers or other articulated conveyances, and more specifically, a device for physically preventing such articulated conveyances from jackknifing.

BACKGROUND

When a tractor trailer or other articulated conveyance is traveling forward, a turning motion, weaving motion, or deceleration may cause a trailer or other following portion to jackknife—that is, to swing outward, beyond the tractor, leading to a loss of control and often a devastating accident.

A rigid connection between the tractor and trailer can be used to prevent the angle between the tractor and trailer from exceeding a particular angle, and thus prevent jackknifing. However, a system for preventing an angle between a tractor and trailer from becoming too great cannot be active at all times, because a turning of the tractor trailer, whether the tractor trailer is in a forward or reverse gear, requires a much greater angle between the two compared to non-turning, forward-driving operation. Thus, there is a need for systems that determine the current status of a tractor trailer and physically prevent movement to a given angle between tractor and trailer only when necessary.

SUMMARY OF THE INVENTION

A system for preventing jackknifing of a tractor and trailer is disclosed. The system comprises an articulated shaft, one or more wave receivers, and a processor. The processor executes instructions that cause the processor receive a notification from the one or more wave receivers that the one or more wave receivers received a first wave, based on a characteristic of the first wave, determine that the trailer is moving at a first velocity of at least a predefined threshold in a forward direction, based on determining that the trailer is moving at the first velocity, cause the articulated shaft to move into a fifth wheel coupling. The processor also receives a notification from the one or more wave receivers that the one or more wave receivers received a second wave, and based on a characteristic of the second wave, determines that the trailer is moving at a second velocity in a backwards direction or of less than the predefined threshold in a forward direction, and based on determining that the trailer is moving at the second velocity, causes the articulated shaft to retract from the fifth wheel coupling. The processor and the one or more wave receivers are outside of and substantially independent of any instrumentation of the tractor.

DETAILED DESCRIPTION

In response to the problems described above, the presently disclosed device, system, and method may be used to prevent jackknifing of a vehicle through actuating a shaft that engages with a fifth wheel coupling when a vehicle is travelling at high speed and that prevents lateral movement of a trailing portion of the vehicle.

Although figures and examples described below focus on the preferred embodiment of installation on a tractor trailer, other transport types could benefit from analogous devices to the present disclosure, where it is beneficial to keep one trailing entity in an orientation following behind a pulling entity, such as a tugboat, non-automobile wheeled vehicle, aircraft or spacecraft, etc.

Figure 1:
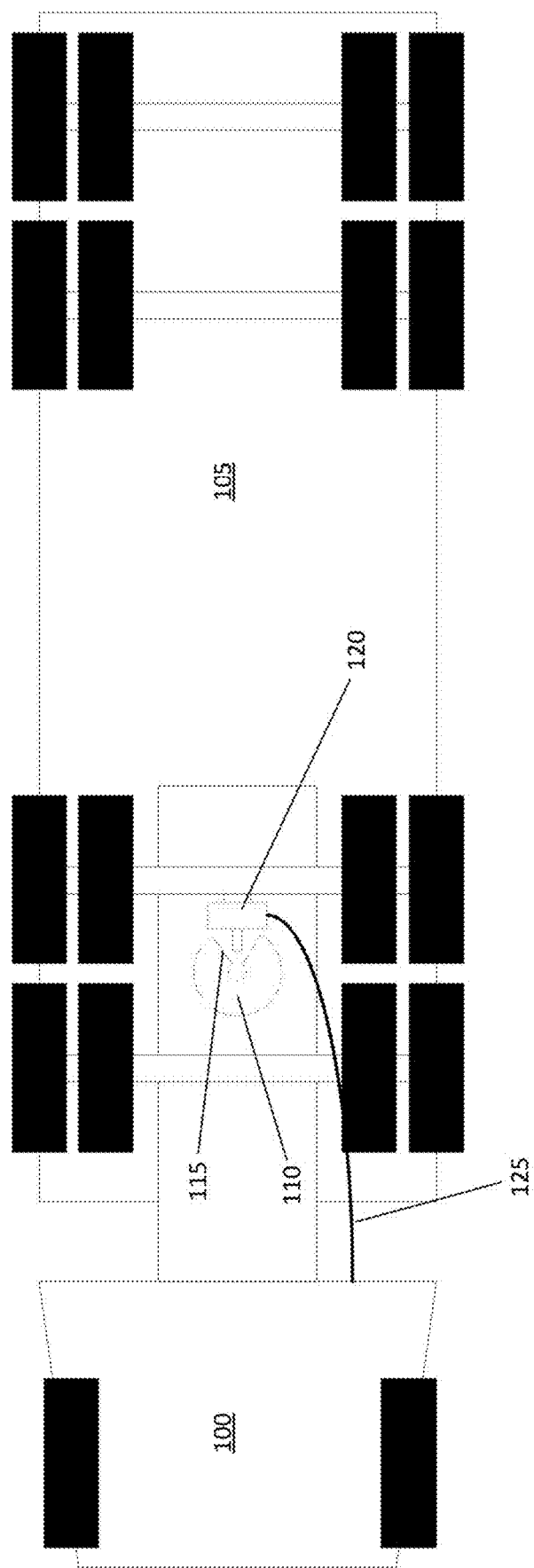
FIG. 1 depicts a tractor trailer comprising a fifth wheel coupling and an apparatus for engaging with the fifth wheel coupling according to the description herein.

FIG. 1 depicts a tractor trailer comprising a fifth wheel coupling and an apparatus for engaging with the fifth wheel coupling according to the description herein.

A tractor 100 is used to pull a trailer 105. The trailer 105 is affixed to the tractor 100 via a fifth wheel coupling 110 near the rear of tractor 100, through the center of which a pin underneath the trailer 105 is securely inserted (as depicted in FIG. 1, in a direction out of the page). The fifth wheel 115 has a gap sector bounded by two edges 115 in the fifth wheel.

An anti-jackknifing apparatus 120 is affixed to the underside of the trailer 105, including within it a shaft suited for insertion into the gap sector of the fifth wheel 115. When the rigid shaft is extended into the gap sector, the maximum angle between the tractor 100 and the trailer 105 is limited because the shaft will come into contact with an edge 115 and be unable to pass through it.

Power to the apparatus 120 is preferably supplied by an auxiliary power cord 125 from the tractor 100, or may in other embodiments be generated or otherwise obtained independent of the tractor 100, as described further below. Apart from the possible power source, apparatus 120 is fully independent of the tractor 100 and does not rely on any data source from the tractor, such as access to the speedometer, to any GPS device installed in the tractor, or any other instrumentation integrated into the tractor.

Figure 2:
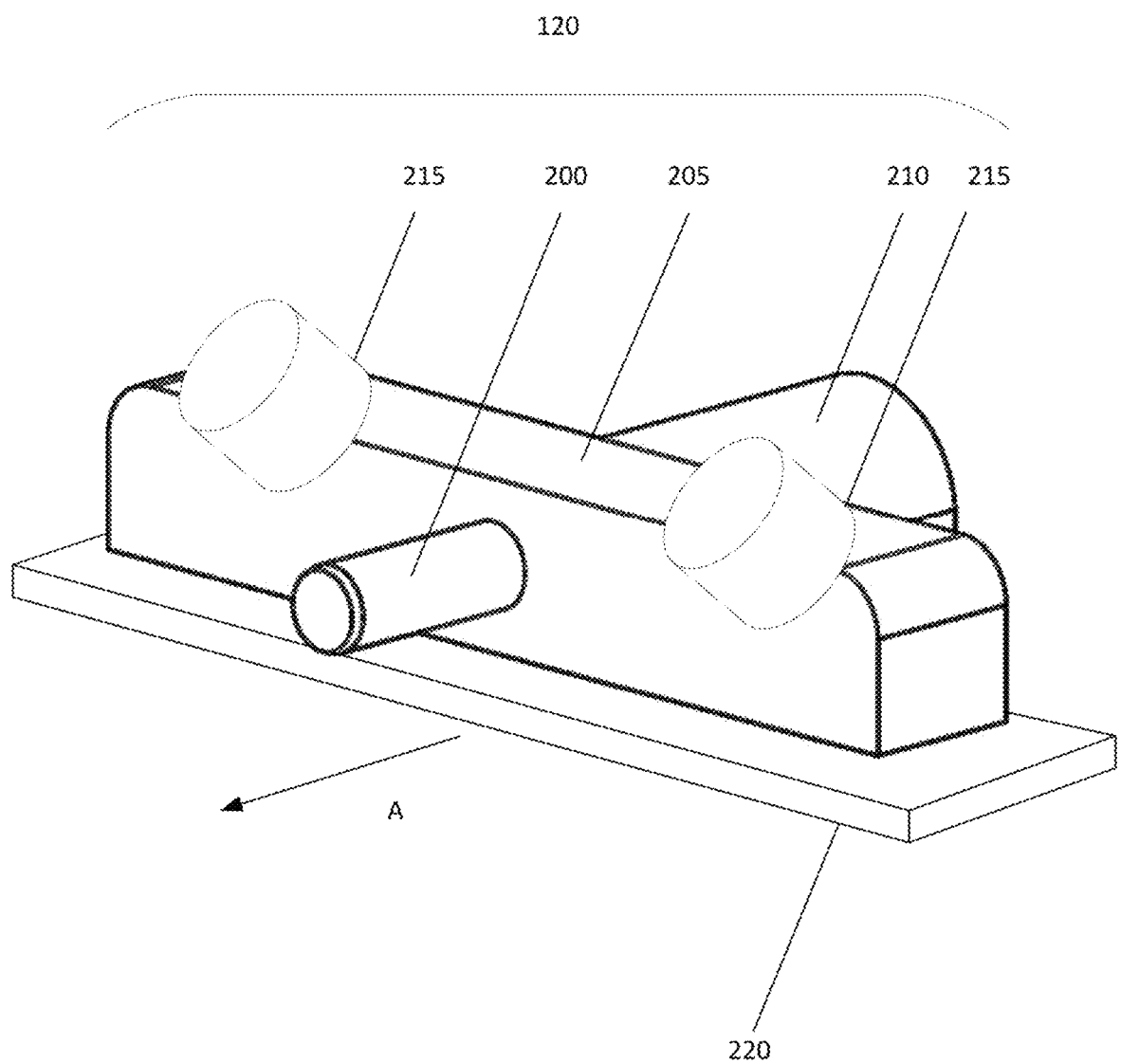
FIG. 2 depicts an apparatus comprising an articulating shaft for enabling an anti-jackknifing system according to the description herein.

FIG. 2 depicts, in greater detail, the apparatus 120 comprising au articulating shaft for enabling an anti-jackknifing system according to the description herein.

A housing 205 is attached to the underside of trailer 105, preferably via a plate 220 that is welded to the underside, and to which the housing is bolted or otherwise affixed. In other embodiments, the apparatus 120 may be affixed directly to the underside of the trailer 105 either permanently, with screws, soldering, etc., or releasably affixed, such as with a very powerful magnet, adhesive, or other releasable mechanical connection.

An articulating shaft 200 is, in a first state, extended (in the direction of Arrow A) from the housing 205 to a position where it will engage with an edge 115 of the fifth wheel if the angle between the trailer 105 and the tractor 100 is too great. In a second state, the shaft 200 is retracted into a shaft housing 210 so that it does not extend as far from the main housing 205 and does not prevent turning of the tractor 100 and trailer 105.

The housing 205 and/or shaft housing 210 preferably contain an electric motor for causing the shaft 200 to extend and retract, as well as an electronic processor to be used in making the determination whether to extend or retract at a given moment in time. In some embodiments, an electric motor may be used only for extension of the shaft 200, while the shaft 200 is spring-loaded or otherwise has a failsafe system to cause automatic retraction if power is lost (and thereby prevent any malfunction that might occur from completely preventing a driver from turning or backing up the vehicle). Alternative methods of extending the shaft 200 other than an electric motor, such as a hydraulic system or solenoid, may be substituted instead.

In some embodiments, instead of a shaft 200 that extends or retracts exclusively along a particular linear axis, a shaft 200 may have a hinge or other pivot point and swing upward or downward from a more vertical position into a horizontal position ready to engage with the edge 115 of the fifth wheel. Any other method of causing the shaft 200 to be ready to engage with or no longer ready to engage with the edge 115 may instead be used.

Power to the apparatus 120 is, as mentioned above, preferably supplied by an auxiliary external electrical cable 125 of the tractor 100. In alternative embodiments, power may instead be supplied by a battery, by solar panels, or by generation of power from movement of the tractor 100 itself (such as by a dynamo attached to a wheel of the tractor 100 or trailer 105, or by a turbine that generates power from the relative movement of the apparatus 120 with the ambient air). The latter embodiment has the advantageous attribute that the system could be configured to activate only when movement generates sufficient power because a duration of sustained movement is the only time the function of apparatus 120 is needed.

The apparatus 120 may also include one or more sensors 215 to be used in determining a current velocity of the tractor 100 and trailer 105.

As depicted, the sensors 215 are positioned so that when the apparatus 120 is affixed to the underside of the trailer 105, they will be aimed at approximately a 45 degree angle downward at the road or other surface upon which the tractor trailer is driving, to facilitate a method of determining vehicle speed depicted in FIG. 3, below.

In other embodiments, a different angle of sensor (such as that necessitated for the method depicted in FIG. 4) may be used, and in yet further embodiments, the sensors may be completely external to the apparatus 120 and communicate with the apparatus via a wired or wireless communications interface (such as a data bus, a Wi-Fi interface, or a Bluetooth interface).

The apparatus 120 also includes sufficient computing components (further described in FIG. 6, below) to allow communication with all sensors, evaluation of data received from those sensors, and triggering of the mechanism for extending the shaft 200.

In one embodiment, apparatus 120 may include a global positioning system (GPS) receiver and determine an estimated velocity by receiving electromagnetic signals from OPS satellites, triangulating the signals to determine geolocation data, and comparing iterative geolocation readings and dividing a distance traveled by a time taken to travel that distance. Similarly, a receiver may triangulate based on electromagnetic signals from other known locations, such as cell towers or other beacons.

In another embodiment, apparatus 120 may include an accelerometer and determine an estimated current velocity by integrating the accelerometer readings with respect to time as the trailer 105 accelerates or decelerates, compared to an initial resting velocity of zero.

In yet another embodiment, apparatus 120 may include an optical sensor, and determine an estimated velocity by iterative imaging of the surroundings of the trailer 105 (for example, determining the time needed to pass over a white lane marker of known length, or the angular rate of motion of a sign passing in front of a camera). A camera or other optical sensor might instead be pointed at the wheels of the trailer 105 or tractor 100 in order to estimate a velocity by observing rotation of a reference point over successive intervals of time and determining a number of wheel rotations per second.

However, in a family of preferred embodiments, velocity is determined via communication with one or more emitters and one or more receivers determining the velocity of the trailer based on the nature of a change in a wave (a change in frequency, in intensity, in its position with respect to a particular reference frame, etc.) between the moment that the wave is emitted and the moment that it is received after reflecting off of a surface. In one most preferred embodiment, depicted in FIG. 3, the wave is preferably electromagnetic and undergoes changes in frequency due to the Doppler effect, while in another embodiment, depicted in FIG. 4, the wave is preferably acoustic and follows a different path through space with respect to the trailer as the trailer's velocity changes.

Figure 3:
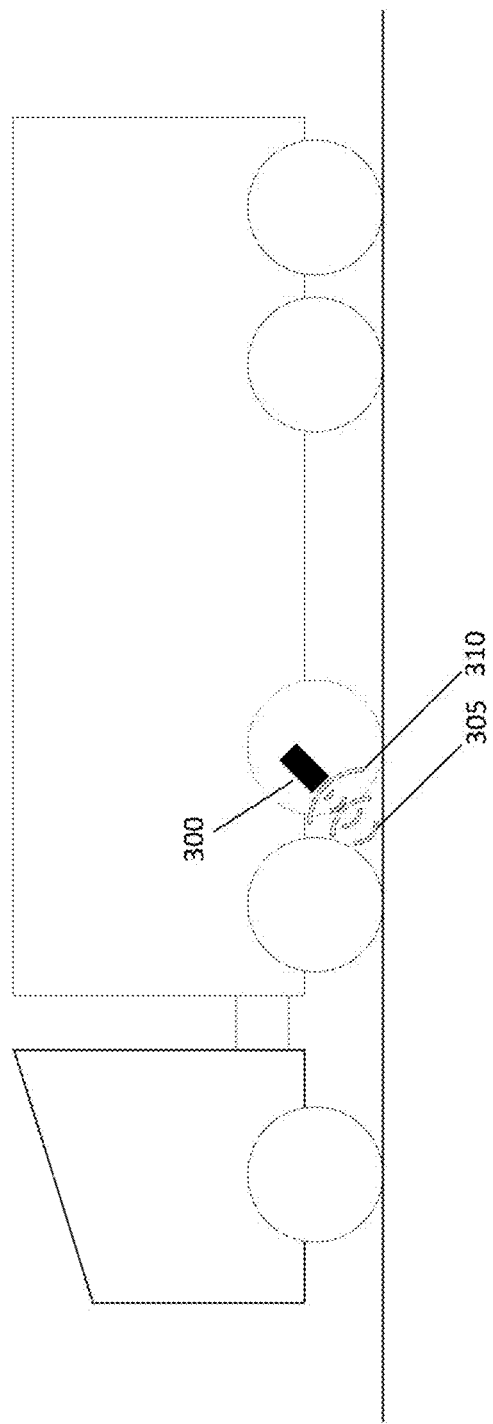
FIG. 3 depicts a first system using electromagnetic waves to determine the velocity of a tractor trailer during operation according to the description herein.

FIG. 3 depicts a first system for determining the velocity of a tractor trailer during operation according to the description herein.

One or more emitter-receivers 300 are mounted on the trailer 105 and preferably aimed downward at the ground or road surface at approximately a 45-degree angle from the trailer 105. The role of emitter-receiver 300 may be played by, in a preferable embodiment, a Delta DRS1000 non-contact speed sensor, produced by and commercially available from GMH Engineering. The emitter-receiver 300 generates a beam 305 of microwave radiation at approximately 35.5 GHz that strikes the surface and reflects 310, in part, back to the emitter-receiver 300. Based on a measured change in frequency between emitted beam 305 and received beam 310, attributed to the Doppler effect, the relative velocity of the trailer 105 with the reflecting surface is estimated.

Instead of microwave radiation, other forms of wave, including another frequency of electromagnetic wave (radar, lidar, visible light, etc.), or even an acoustic wave (sonar or subsonic or ultrasonic wave), may be used.

Although a 45-degree angle between the beam and the road surface is preferred, other angles between 0 and 90 degrees may be used with varying effect on sensor accuracy or based on the construction of a particular tractor or trailer. Further, the beam may alternatively be aimed laterally to reflect against road signs or other available markers instead of against the road surface itself.

The emitter-receiver 300 is in constant communication with the apparatus 120 and reports the determined velocity to the apparatus 120 preferably at least once a second, and even more preferably about every 0.01 seconds. In some embodiments, multiple emitter-receivers 300 may be used to provide redundancy, either by having a second emitter-receiver begin reporting velocity when the first reports a malfunction, by having the second emitter-receiver constantly report velocity to generate an error notification when the two emitter-receivers report significantly different values, or by having an estimated speed be determined by averaging or otherwise mathematically manipulating the values reported by each sensor.

Figure 4:
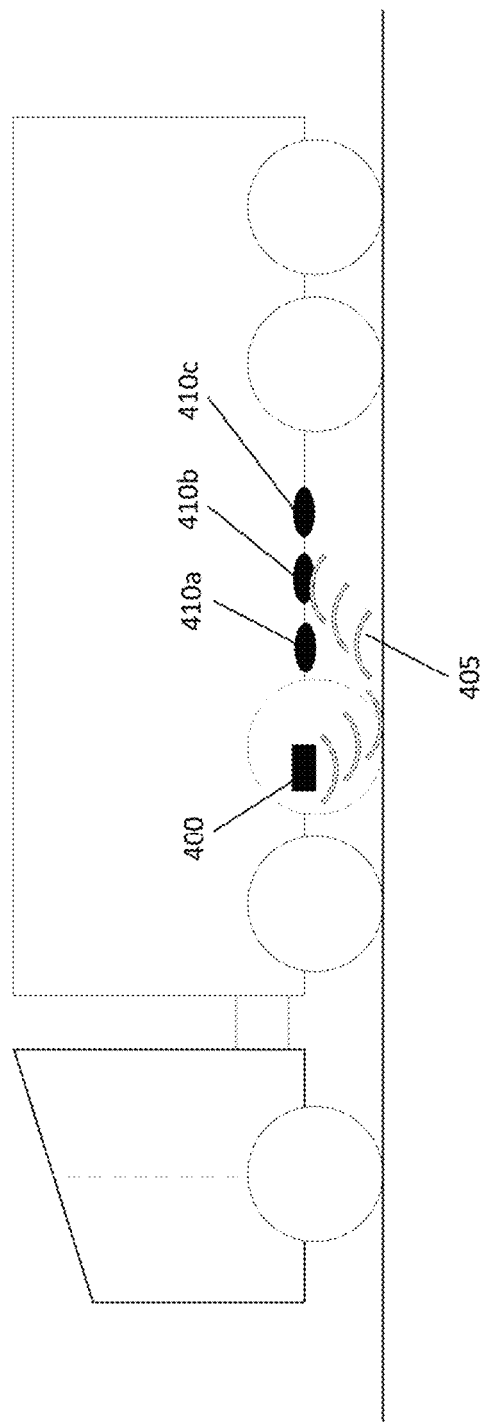
FIG. 4 depicts an alternative system using acoustic waves to determine the velocity of a tractor trailer during operation.

FIG. 4 depicts an alternative system for determining the velocity of a tractor trailer during operation according to the description herein.

One or more emitters 400, which are either integrated into the apparatus 120 or merely in communication with the apparatus 120, emit one or more waves 405. As described previously in another embodiment, the waves 405 may be electromagnetic waves (such as radar, lidar, risible light, microwaves, or any other form of electromagnetic radiation) or acoustic waves (such as sonar), but a wave with lower velocity in comparison to the trailer, like an acoustic wave, is preferred, in order that the lateral movement of the trailer with respect to the waves be maximized.

In a preferred embodiment, the waves 405 are oriented directly downward at the road or other ground surface. In other embodiments, the waves 405 may be oriented to strike the road at an angle or to strike a surface above the ground, such as a sign, other vehicle, building, or other entity near a road.

One or more receivers 410*a*-401*n* are arranged to receive the waves 405 after they have reflected off the road or other available surface. Based on the decrease in intensity of the waves 405 between emission and reception, or based on comparing intensities of waves received at multiple receivers in different locations, a velocity of the trailer 105 with respect to the reflecting surface can be estimated. For example, as depicted in FIG. 4, if a wave is sent directly downward by emitter 400 and received most strongly by receiver 410*b*, it can be inferred from the total distance traveled by the wave, by the known time required to pass to the ground and back, what the velocity of the trailer 105 is that would cause the wave to travel that distance during that time. A single emitter may generate timed pulses with differing characteristics such that the timing or other characteristics of the pulses received by a particular receiver provide data about the speed of the trailer 105.

Various arrangements of emitters 400 (or arrays of emitters) and receivers 410 (or multiple arrays of receivers) may be used to improve accuracy through averaging of additional readings, less loss of wave power, comparison of readings from separate receivers, etc. By arranging receiver 410 behind emitters 400, an additional advantage is that the wave 405 will ideally not be received at all when the trailer 105 is moving in reverse, and thus will never trigger extension of shaft 200 when the full range of motion is needed during a backing up.

In each of the previously described embodiments, velocity is determinable without access to the tractor 100's speedometer, any other instrumentation of the tractor 100, or any particular computing device possessed by a driver of the tractor 100. As a result, the presently described systems may be installed on the surface of the trailer 105 or on the surface of the tractor 100 without regard to a model of the tractor 100 or making any permanent modifications to the tractor 100.

Through one or more of various methods of determining the velocity of the trailer 105, a processor of apparatus 120 can cause the shaft 200 to be extended when and only when the velocity remains above a certain predefined threshold.

Figure 5:
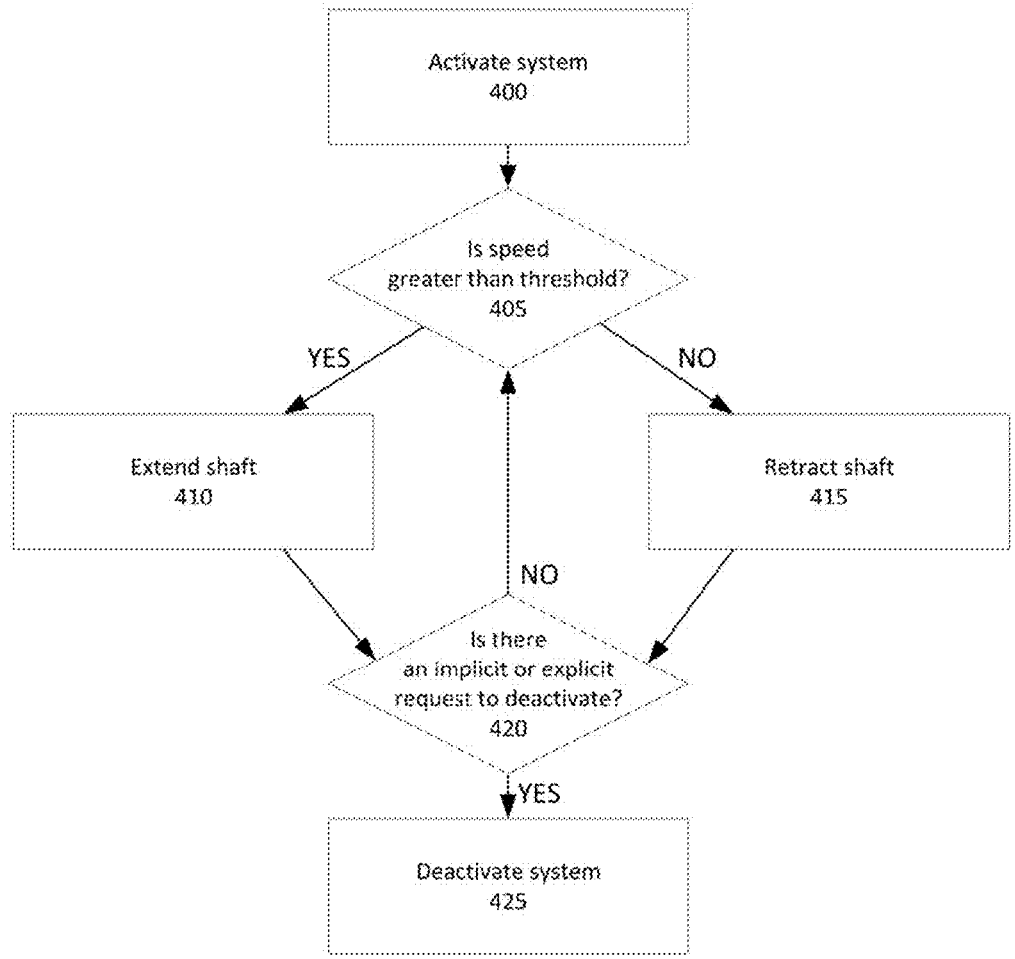
FIG. 5 depicts, in simplified form, a method of actuating and disabling an anti-jackknifing system during operation of a vehicle.

FIG. 5 depicts, in simplified form, a method of actuating and disabling an anti-jackknifing system during operation of a vehicle according to the description herein.

Initially the anti-jackknifing system is activated (Step 500). Activation may occur automatically if electrical power is supplied by an auxiliary electrical cable when the engine of the tractor 100 is turned on; in alternative embodiments, a button on the apparatus 120 may be used to turn it on, or it may have as wireless interface waiting for an activation command from an app on a driver's mobile phone.

After activation, the apparatus 120 continually uses any available methods to determine the velocity of the trailer 105 and compare it to a predetermined threshold (Step 505). Although the threshold may be set differently based on differing trailer weights or other trailer qualities, or on differing tractor weights or other tractor qualities, or on a risk tolerance for the possibility of jackknifing, in a preferred embodiment, the threshold is set to about eight miles per hour in the forward direction. At below this threshold, the risk of jackknifing is virtually nonexistent, and a range of motion is necessary in case the tractor trailer is making a turn or backing up.

Whenever the determined velocity exceeds the threshold, the shaft 200 is extended to prevent jackknifing (Step 510). As soon as the determined velocity drops below the threshold, the shaft 200 is actively retracted or a force causing it to extend is ceased so that it is permitted to automatically retract (Step 515). One or more lights may be installed on the side of the trailer 105 to indicate possible statuses of the apparatus 120, including that the shaft 200 is extended, that it is retracted but on standby and ready to extend, or that it is retracted but will not extend due to being in a deliberately disabled state or experiencing a system malfunction.

In addition to constantly monitoring speed, the system also monitors for any implicit or explicit request to deactivate the system (Step 520). An implicit request may include the engine of the tractor being turned off so that it no longer supplies power to the apparatus 120, while an explicit request may be transmitted by a driver pressing a disable button on the apparatus 120, or on a device in communication with the apparatus 120 such as the driver's mobile phone or a failsafe button module installed in the tractor 100.

When the system receives a request to deactivate, it does so (Step 525), causing retraction of the shaft 200, a cessation of velocity monitoring, and any other measures necessary to cease interference by the apparatus with the function of the tractor trailer.

Figure 6:
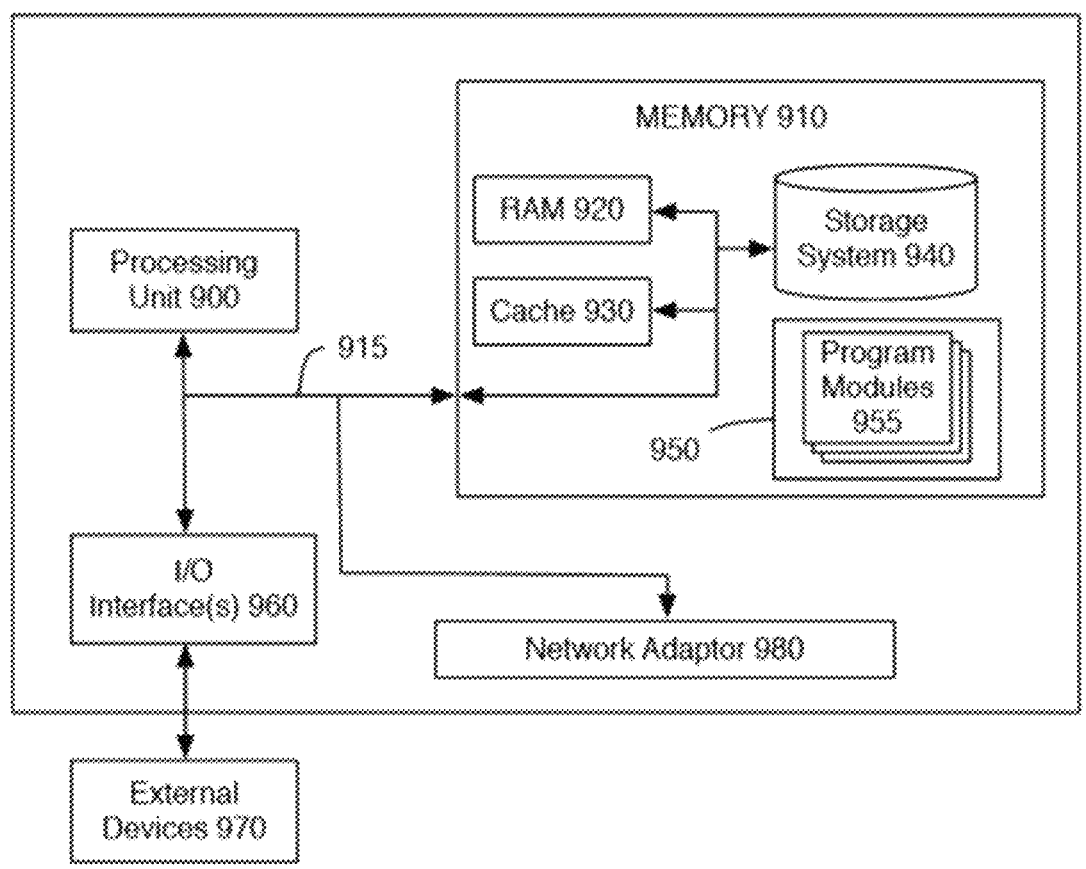
FIG. 6 is a high-level block diagram of a representative computing device that may be utilized to implement various features and processes described herein.

FIG. 6 is a high-level block diagram of a representative computing device that may be incorporated within, affixed to, or otherwise in communication with apparatus 120, utilized to implement various features and processes described herein, including, for example, for executing software to make apparatus 120 communicate with the various described sensors and actuate the shaft 200 into position or retract it from its position. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 6, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, hut is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or Other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, program able logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions tor implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for preventing jackknifing of a trailer pulled by a vehicle, comprising:
    an articulated shaft attached to the trailer,
    one or more wave receivers, and
    one or more processors executing instructions that cause the one or more processors to:
        receive a notification from the or more wave receivers that the one or more wave receivers received a first wave,
        based on a characteristic of the first wave, determine that the trailer is moving at a first velocity of at least a predefined threshold in a forward direction,
        based on determining that the trailer is moving at the first velocity, cause the articulated shaft to move into a fifth wheel coupling of the tractor,
        receive a notification from the one or more wave receivers that the one or more wave receivers received a second wave,
        based on a characteristic of the second wave, determine that the trailer is moving at a second velocity in a backwards direction or of less than the predefined threshold in a forward direction, and
        based on determining that the trailer is moving at the second velocity, cause the articulated shaft to retract from the fifth wheel coupling.

2. The system of claim 1, wherein the characteristic of the first wave and the characteristic of the second wave is frequency.

3. The system of claim 1, wherein the characteristic of the first wave and the characteristic of the second wave is intensity.

4. The system of claim 1, wherein the characteristic of the first wave and the characteristic of the second wave is position with respect to the trailer.

5. The system of claim 1, wherein the predefined threshold is approximately eight miles per hour.

6. The system of claim 1, wherein the one or more wave receivers are mounted on an underside surface of the trailer.

7. The system of claim 1, wherein the first and second waves are electromagnetic waves in the infrared spectrum.

8. The system of claim 1, herein the first and second waves are acoustic waves.

9. The system of claim 1, further comprising One or more wave emitters, wherein the one or more crave emitters emit waves, of which the first wave and second wave are reflections after the emitted waves have struck a surface.

10. The system of claim 1, wherein the processor and the one or more wave receivers are outside of and substantially independent of any instrumentation of the vehicle.

11. A computer-implemented method of preventing jackknifing of a trailer pulled by a vehicle, comprising:

receiving a notification from one or more wave receivers that the one or more wave receivers received a first wave, based on a characteristic of the first wave, automatically determining that the trailer is moving at a first velocity of at least a predefined threshold in a forward direction, based on determining that the trailer is moving at the first velocity, cause the articulated shaft to move into a fifth wheel coupling of the tractor, receive a notification from the one or more wave receivers that the one or more wave receivers received a second wave, based on a characteristic of the second wave, determine that the trailer is moving at a second velocity in a backwards direction or of less than the predefined threshold in a forward direction, and based on determining that the trailer is moving at the second velocity, cause the articulated shaft to retract from the fifth wheel coupling.

12. The computer-implemented method of claim 11, wherein the characteristic of the first reflection and the characteristic of the second reflection is frequency.

13. The computer-implemented method of claim 11, wherein the characteristic of the first wave and the characteristic of the second wave is intensity.

14. The computer-implemented method of claim 11, wherein the characteristic of the first wave and the characteristic of the second wave is position with respect to the trailer.

15. The computer-implemented method of claim 11, Wherein the predefined threshold is approximately eight miles per hour.

16. The computer-implemented method of claim 11, wherein the one or more wave receivers are mounted on an underside surface of the trailer.

17. The computer-implemented method of claim 11, herein the first and second waves are electromagnetic waves in the infrared spectrum.

18. The computer-implemented method of claim 11, wherein the first and second waves are acoustic waves.

19. The computer-implemented method of claim 11, wherein the one or more wave emitters are utilized to emit waves, of which the first wave and second wave are reflections after the emitted waves have struck a surface.

20. The computer-implemented method of claim 11, wherein a computer implementing the computer-implemented method and the one or more wave receivers are outside of and substantially independent of any instrumentation of the vehicle.

* * * * *